H. R. UNDERHILL.
Plow.

No. 204,513.  Patented June 4, 1878.

WITNESSES:
Francis McArdle.
C. Sedgwick.

INVENTOR:
H. R. Underhill
BY Munn & Co.
ATTORNEYS.

UNITED STATES PATENT OFFICE.

HAZEN R. UNDERHILL, OF DERRY, NEW HAMPSHIRE.

IMPROVEMENT IN PLOWS.

Specification forming part of Letters Patent No. 204,513, dated June 4, 1878; application filed March 30, 1878.

*To all whom it may concern:*

Figure 1:
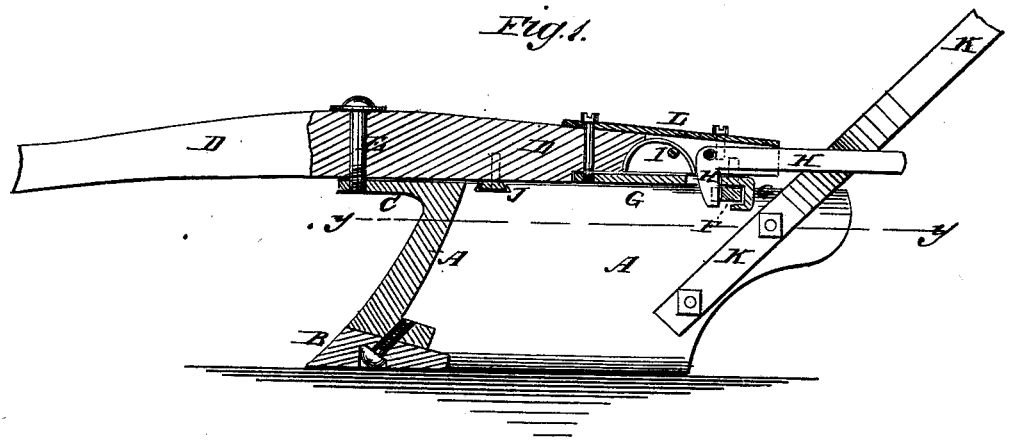
Figure 2:
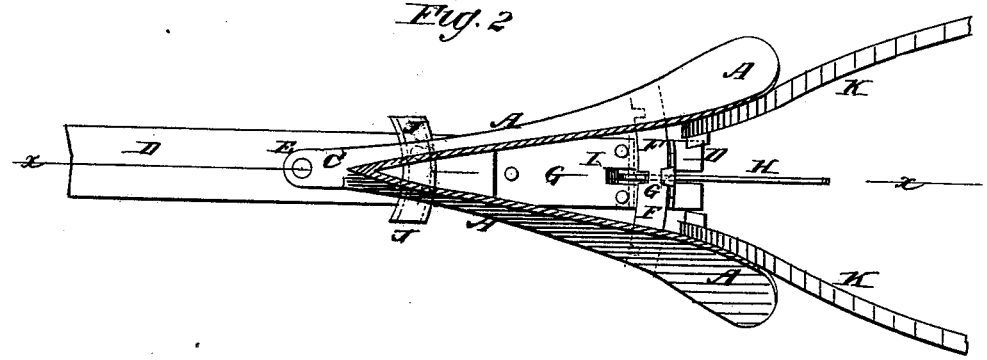

Be it known that I, HAZEN R. UNDERHILL, of Derry, in the county of Rockingham and State of New Hampshire, have invented a new and useful Improvement in Double Mold-Board Side-Hill Plows, of which the following is a specification:

Figure 1 is a vertical longitudinal section of my improved plow, taken through the line $x$ $x$, Fig. 2. Fig. 2 is a horizontal section of the same, taken through the line $y\,y$, Fig. 1, looking upward.

Similar letters of reference indicate corresponding parts.

The object of this invention is to furnish an improved double mold-board side-hill plow, which shall be so constructed as to be available in any ordinary plowing, which shall be simple in construction, convenient in use, and easily adjusted to turn the furrow in either direction.

The invention consists in the construction and combination of parts, which will be hereinafter more fully described, and then set forth in the claim.

A represents the plow, which is made with two mold-boards, one upon each side, as shown in Fig. 2, and to the forward end of which the point B is secured by a screw or bolt in the usual way. Upon the upper forward corner of the plow A is formed an arm, C, which projects forward beneath the beam D, and has a hole formed through it to receive the bolt E, which passes down through the beam D, as shown in Fig. 1, the arm C being made of such a length that the pivoting-bolt E may be nearly over the point of the plow, so that the said point will be nearly in line with the cutter when used and with the beam, however it may be adjusted. The lower rear part of the mold-boards of the plow A may be kept in proper position by a block or brace interposed between them. The upper rear part of the mold-boards of the plow A are kept in position by a curved bar, F, attached to the upper edges of the rear part of the said mold-boards.

To the lower side of the rear end of the plow-beam D is attached a plate, G, which has a hook formed upon its rear end to engage with the bar F, and thus hold the end of the plow-beam down upon the said bar F.

H is a lever-latch, which is inserted and pivoted in a slot in the rear end of the plow-beam D, so that its forward or engaging end may project downward along the forward edge of the cross-bar F and enter one or the other of the notches formed in its said forward edge. By this construction, by operating the lever-latch H with his foot, the plowman can unfasten the beam and move its rear end to one or the other side, as may be desired. The lever-latch H is thrown into and held in the notches of the bar F by a spring, I, placed in the inner end of the slot of the beam D and resting against the forward part of the said latch H.

In the upper edge of the forward part of the mold-boards of the plow A is formed a notch or its equivalent, to receive the curved bar J or its equivalent, which is firmly attached to the plow-beam D, so as to sustain the draft-strain, and thus relieve the bolt E.

K are the handles, which are bolted to the rear ends of the mold-boards of the plow A, as shown in Fig. 1. The slotted rear end of the plow-beam D is strengthened by the hook-plate G and by a plate, L, bolted to its upper side, as shown in Fig. 1.

Having thus described my invention, what I claim as new, and desire to secure by Letters Patent, is—

The combination of the recessed beam D, hooked plate G, lever H, spring I, transverse notched cross-bar F, and front bar J with the double mold-board A, point B, pivoting-arm C, and bolt E, all constructed and relatively arranged as herein set forth, for the purpose specified.

HAZEN R. UNDERHILL.

Witnesses:
WILLIAM P. POOR,
D. A. KING.